United States Patent Office 3,399,882
Patented Sept. 3, 1968

3,399,882
HYDRAULIC SHOCK ABSORBER ASSEMBLY WITH PARALLEL-CONNECTED GAS SPRING AND AUTOMATICALLY CONTROLLABLE DAMPING, PARTICULARLY FOR MOTOR VEHICLES
Erwin Hausmann, Wuppertal-Elberfeld, Germany, assignor to August Bilstein KG, Ennepetal-Altenvoerde, Germany, a corporation of Germany
Filed Jan. 3, 1967, Ser. No. 607,054
Claims priority, application Germany, Jan. 8, 1966, B 85,323
11 Claims. (Cl. 267—64)

ABSTRACT OF THE DISCLOSURE

Hydraulic shock absorber assembly wherein a gas spring, a control member and the shock absorber proper are united in an integral structure, the gas spring being mounted in a space sealed by a roller-type bellows located between a damping cylinder and a protective tube, the space being directly connected through a pressure gas connecting duct with a control chamber located at the free end of a piston rod and containing the control member.

---

My invention relates to hydraulic shock absorber assembly adapted particularly for use with motor vehicles and having parallel-connected gas spring and automatically controllable damping in accordance with the gas spring load.

Such shock absorbers have a cylinder partly filled with damping liquid, a damping piston located in the cylinder and a piston rod carrying a protective tube which surrounds and is spaced from the damping piston as well as the damping cylinder. An adjusting rod which controls throttle openings is mounted in the piston rod and is adjustable by a control member actuatable in response to the load-dependent gas spring pressure. Controllable hydraulic shock absorvers of this type having parallel-connected motor vehicle gas suspension afford a greater driving security with simultaneously increased driving comforts because, not only the gas spring or gas suspension, which keeps the vehicle at a desired constant level, but also the damping force are simultaneously suitably varied in dependence upon the respective vehicle loading, so that for every loading condition of the vehicle, one can drive with adjusted spring suspension and damping.

With the known motor vehicle supports of the aforementioned type such as is, for example, disclosed in the French Patent 1,297,054, the control member which regulates the throttle openings of the controllable hydraulic shock absorber, is constructed in the form of an axially displaceable sealed piston which is actuated by the pressure gas of the gas spring that is mounted spaced apart from the shock absorber in the motor vehicle and suitably twists the adjusting rod located in the piston rod so as to regulate the throttle openings. Also, for other known shock absorbers controllable in dependence upon the loaded motor vehicle suspension, and which operate either with more or less throttled damping liquid circulation such as, for example, U.S. Patent No. 1,724,423 and German published application No. 1,111,040, or operate as a friction damper such as is, for example, disclosed in German published application 1,182,966, the gas spring controlling the control member of the damper is constructed as a special suspension element mounted in the motor vehicle at a distance from the damper, the suspension element being connected by a suitable connecting duct with the regulating chamber containing the control member in the damper. This construction, however, not only causes great installation and assembly difficulties in the limited space between the motor vehicle axles and the chassis, but also leads in that respect to deficiencies in control, as the regulation of the damper force of the respective gas spring loading can only be inaccurately adjusted because of the different localities in the motor vehicle at which the damper is installed.

It is accordingly an object of my invention to provide hydraulic shock absorber with parallel-connected gas spring and automatically controllable damping, particularly for motor vehicles, which avoids the aforementioned disadvantages of the heretofore known shock absorbers of this type. More specifically, objects of my invention are to provide such a shock absorber of simplified and compact constructional type as will more accurately control damping in dependence upon the pressure of the gas spring adjusted to the respective motor vehicle loading.

With the foregoing and other objects in view, I provide in accordance with my invention, such a hydraulic shock absorber assembly wherein the gas spring, the control member and the shock absorber proper are united into an integral structure, the gas spring being mounted in a space sealed by a roller-type bellows located between the damping cylinder and the protective tube, the space being directly connected through a pressure gas connecting duct with a control chamber located at the free end of a piston rod and containing the control member. This furnishes a motor vehicle support element of closed construction which is space-saving and easily assemblable, this support element not only surrounding the load-dependent controllable hydraulic shock absorber proper but also simultaneously surrounding the gas spring maintaining the desired motor vehicle level position, permitting, for its part, an improved control, because it is a direct control of the control member which regulates the damping.

According to a further feature of my invention, the control member advantageously comprises a dome-shaped membrane extending into the control chamber and supported on the rear side thereof by a suitably formed pressure bushing maintained under spring tension, which for its part, is connected by a comparatively narrow connecting rod, inserted sealingly in the piston rod bore, with the therein axially adjustable adjusting rod. The adjusting rod is smaller in diameter than the piston rod bore and at its other throttle-controlling end located in the piston rod, which end is located in the vicinity of the piston, extends into the piston rod bore and is provided with bores for the passage of liquid, which connect the annular space located between the adjusting rod and the piston rod bore to the working chamber to the damping cylinder. In this manner the dynamic liquid forces acting on the axially adjustable adjusting rod during the operating movements of the shock absorber are suitably reduced because the effective cross section of the adjusting rod remains relatively small due to the comparatively thin connecting rod. Insofar as the thereby corresponding liquid forces act on the adjusting rod, these forces can be compensated in the control chamber containing the control member by the changes in gas pressure occurring with the same rhythm as that of the shock absorber lift or travel movements. This is a further advantage of the gas spring which is directly built into the controllable damper because by this type of construction the regulating function of the control member and the adjusting rod is not disturbed by the operation of the damper.

A particularly compact type of construction is achieved when the control chamber housing containing the control chamber and the control membrane with pressure bushing and supporting spring is located beneath or within the shock absorber and therewith, the upper chamber housing part is provided with a suitably projecting mounting pin or lug, and both chamber housing parts are pierced by bores forming the pressure gas connecting ducts in the vicinity of the periphery of the housing parts. It is also possible, however, to arrange the control chamber housing above or outside of the shock absorber mounting location and in addition to provide at the lower part of the control chamber housing a mounting tube surrounding and slightly spaced from the piston rod. The mounting tube carries at its lower end a connecting sleeve holding the protective tube as well as the roller-type bellows. Thus, connecting channels lead from the annular space located between the piston rod and the mounting tube to both the gas spring chamber and the control chamber.

In accordance with other features of my invention, a pressure gas supply duct communicates with the gas spring chamber or the control chamber and comes from a compressor or a filling valve. Through this supply duct, the gas spring can be pumped up or down in accordance with the loading of the vehicle, which is advantageously effected in the case of a compressor by control from the driver's seat of the vehicle, and in other cases by pumping up or releasing the gas pressure through the filling valve.

Other features which are considered as characteristic for the invention are set forth in the appended claims.

Although the invention is illustrated and described herein as embodied in hydraulic shock absorber with parallel-connected gas spring and automatically controllable damping, particularly for motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
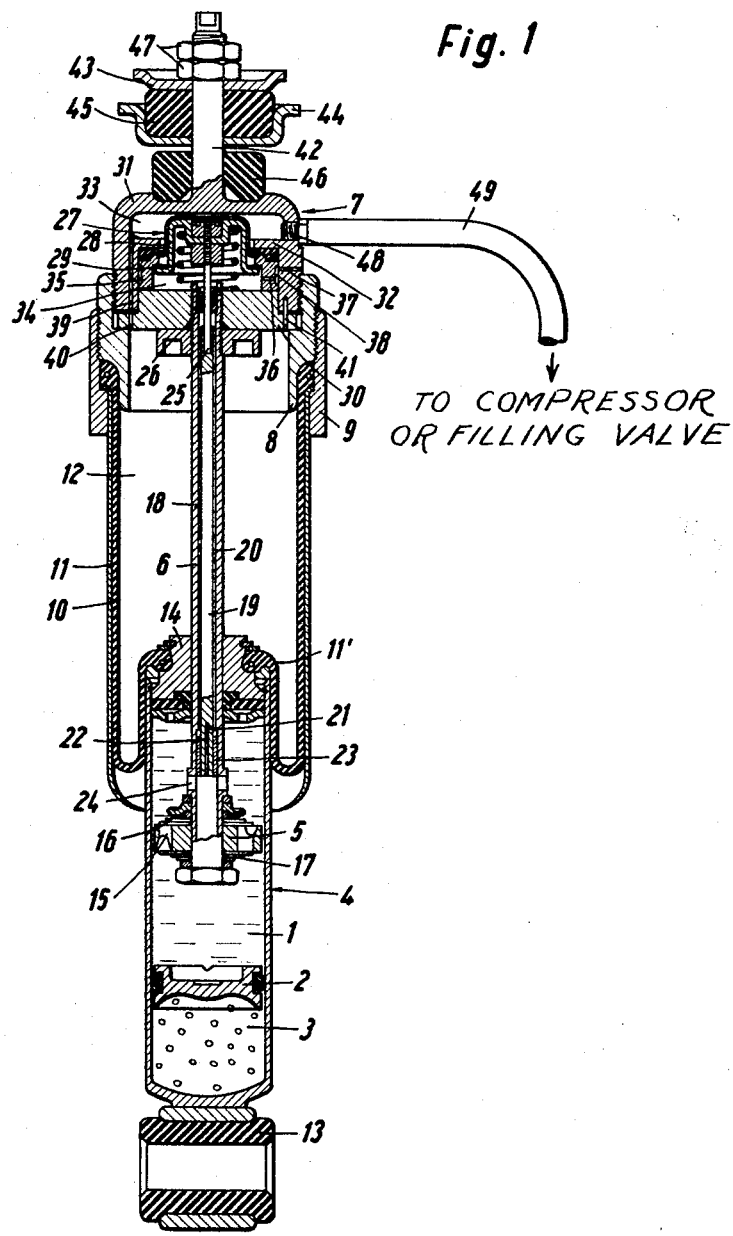
FIG. 1 is a longitudinal section of one embodiment of the controllable shock absorber with built-in gas spring constructed in accordance with my invention.

Referring now to the drawings, and first particularly to FIG. 1 thereof, there is shown a controllable hydraulic shock absorber with built-in gas spring having a damping cylinder 4 filled partly with damping liquid 1 and pressure gas 3, such as nitrogen especially, separated from the damping liquid 1 by the sealed separating piston 2. A damping piston 5 is located in the liquid region of the damping cylinder 4 and is carried by a piston rod 6 at one end thereof. At the other end of the piston rod 6 there is located a control chamber housing 7 containing a control or regulating member, hereinafter described in greater detail. A protective tube 10, containing a roller-type bellows 11, is secured by a threaded bushing 8 and a connecting sleeve or collar 9 to the housing 7. The space 12 sealed by the roller-type bellows 11, which is located between the protective tube 10 and the damping cylinder 4, is filled with pressure gas that serves as a gas spring for partial support of the vehicle in addition to other vehicle supports, the pressure of the gas spring being adjustable in accordance with the respective vehicle load. At the lower end of the damping cylinder 4 there is located a mounting lug 13 and, at the upper end of the cylinder 4, there is provided a multipartite seal 14 for the piston rod 6 passing therethrough. The roll bellows 11 has an inwardly inverted end 11' secured to the sealing head 14. The damping piston 5 is provided with throttle openings 15 effective in both operating directions in conventional manner, which are respectively covered or regulated by groups of valve spring washers or discs 16 and 17.

The piston rod 6 is provided with a longitudinal bore 18 in which an axially adjustable adjusting rod 19 is mounted. The adjusting rod 19 has a smaller diameter than the diameter of the piston rod bore 18 so that a corresponding cylindrical annular space 20 remains free between the inner surface of the piston rod 6 and the adjusting rod 19. This annular space 20 is in constant communication with the operating chamber 1 through the channels 21, 22 provided in the inner end of the adjusting rod 19. Moreover, a bushing or sleeve 23 is provided at the inner end of the adjusting rod 19, through which the adjusting rod is axially displaceably guided in the piston rod bore 20 and is able to uncover more or less the throttle openings 24 located in the piston rod 6. The permanent passage located between both operating chamber halves situated on either side of the damping piston 5 is thereby accordingly controlled and, therewith, the degree of damping is regulated.

The adjusting rod 19 has at its upper end a relatively narrow connecting rod 25 which passes through a seal 26 located at the upper end of the piston rod 6 and is threaded in a pressure box 28 supporting a dome-like membrane 27. The pressure box 28 is supported by the helical spring 29 on the lower housing chamber portion 30 secured to the piston rod 6. The housing chamber portion 30 together with the dome-like housing upper portion 31 form the control housing 7 which is subdivided into a control chamber 33 by the inwardly extending circular flange 32 located at the upper portion 31, and a lower chamber 34 containing the pressure member 28 and the helical spring 29. A pressure ring 35 is inserted in the lower chamber 34 and sealingly presses the marginal periphery of the membrane 27 against the inwardly bent flange 32. The lower chamber 34 communicates with the outer atmosphere through the bores 36 and 37 as well as the annular groove 38 provided in the pressure ring 35. In the housing upper part 31 as well as lower part 30 there are provided mutually aligned bores 39 and 40 which form the pressure gas connecting ducts between the control chamber 33 and the gas spring chamber 12. The centering pin 41 located between the parts 30 and 31 ensures that the bores 39 and 40 are in registry when the control housing is assembled.

At the upper part 31 of the housing, there is provided a mounting pin 42 which carries connector plates 43, 44 serving for the upper connection of the shock absorber, as well as rubber bumpers or cushions 45, 46 and lock nuts 47. Moreover, a connecting piece 48 for the inlet of a pressure gas supply duct 49 is provided in the upper housing part 31. Through the duct 49, the amount of pressure gas required for compensating the different motor vehicle loads can be supplied to the control chamber 33 and the gas spring chamber 12 directly connected therewith, and a corresponding amount of gas can be released or bled off.

Depending upon the loading of the vehicle, a suitable gas pressure is adjusted in the gas spring chamber 12. The gas pressure acts through the connecting channels 39, 40 and the control chamber 33 directly on the regulating membrane 27 which thereby axially adjusts the adjusting rod 19 accordingly, whereby the effective cross section of the throttle openings 24 are varied more or less. If the vehicle load and therewith also the gas pressure in the gas spring chamber 12 as well as in the control chamber 33 both increase, the regulating membrane 27 is thereby struck more strongly and the adjusting rod 19 is therewith further shoved inwardly whereby the effective cross section of the throttle openings 24 is reduced and therewith a correspondingly greater damping is produced. Conversely, for an unloaded vehicle and the thereby correspondingly reduced pressure in the gas spring chamber 12 and in the control chamber 33, there occurs a reduction in the loading of the regulating membrane 27, which is thereby forced further into the control chamber 33 under the action of the helical spring 29, so that the accordingly entrained adjusting rod 19 further opens the throttle openings 24. The damping accordingly diminishes.

Figure 2:
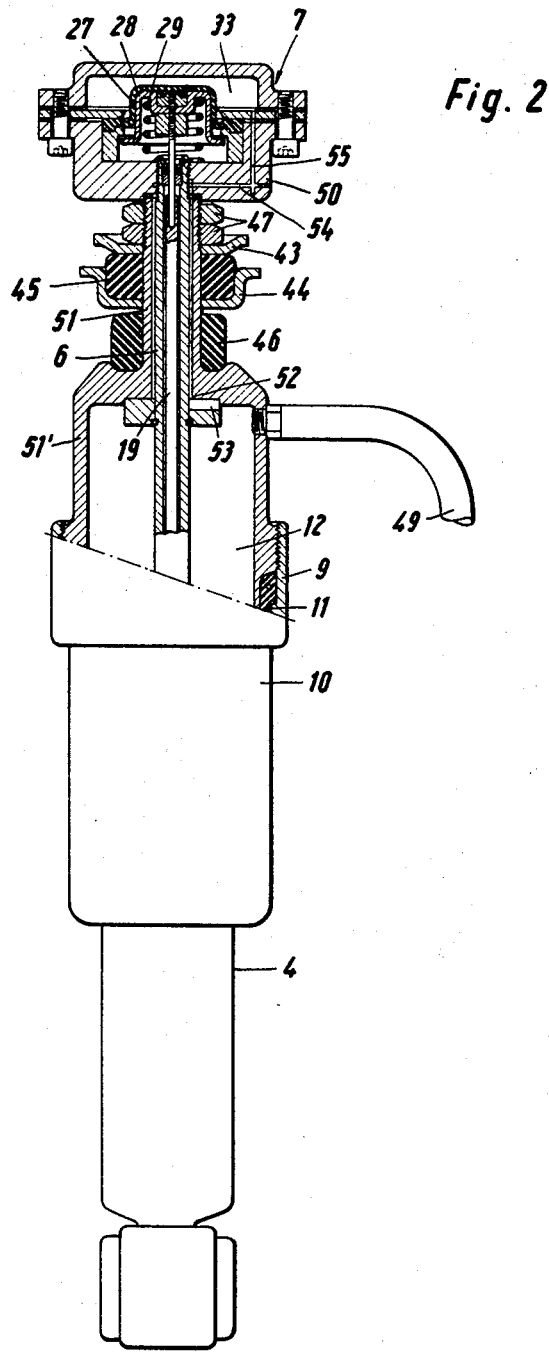
FIG. 2 is a longitudinal view partly in section of a second embodiment of FIG. 1.

In the embodiment of FIG. 2 the control chamber housing 7 is located above or outside of the shock absorber connecting members 43 to 47. In addition, there is provided on the lower housing chamber part 50, a mounting tube 51 surrounding and slightly spaced from the piston rod 6. The mounting tube 51 carries the aforementioned connecting members 43 to 47 and, at its lower widened or enlarged end 51' also carries the connecting sleeve or collar 9 holding the protective tube 10 and the roller-type bellows 11. Connecting channels 53 and 54, 55 respectively extend from annular space 52 located between the piston rod 6 and mounting tube 51 to the gas spring chamber 12 and to the control chamber 33. The pressure gas supply duct 49 in this case runs into the gas spring chamber 12. It can, however, also be connected just as well to the control chamber 33. Moreover, there is provided in the embodiment of FIG. 2, the piston rod 6, the adjusting rod 19 located therein, the control chamber housing 7 with the regulating membrane 27 located therein, the pressure box 28 supporting the latter and the helical spring 29 as well as all further parts of the same structure and arrangement as are present in the embodiment of FIG. 1. Also, the operation of the embodiment of FIG. 2 is basically the same as that of FIG. 1.

Figure 3:
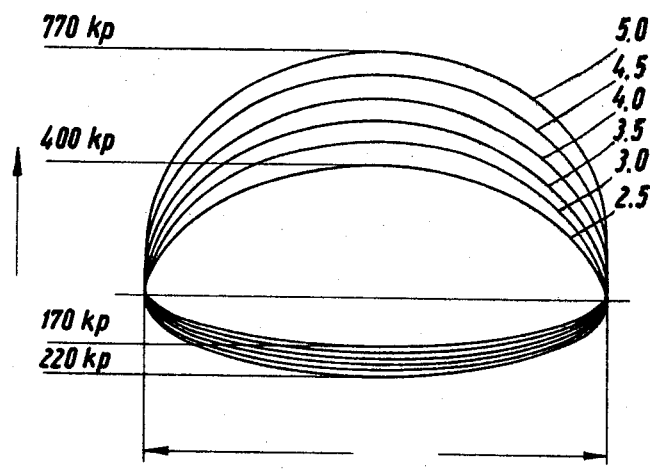
FIG. 3 is a working plot diagram for the controllable shock absorber with built-in gas spring of my invention.

The operation of the shock absorber of my invention can be ascertained from the working diagram of FIG. 3 wherein the damping force P in kilopounds is plotted against travel or lift in mm. for a maximum piston velocity of 0.52 m./s. (100 mm. of piston travel at 100 revolutions per minute). The individual curves were plotted within the range of 2.5 atmospheres (empty vehicle) to 5 atmospheres (loaded vehicle) air spring bellows pressure in steps of 0.5 atmosphere each.

The desired increase of damping force P with increasing vehicle loading or increasing gas spring pressure is especially clearly evident in the illustrated pressure steps. The indicated extreme or end values of P clearly show that a doubling of the gas spring pressure nearly produces a doubling of the damping force.

I claim:

1. Hydraulic shock absorber assembly with parallel-connected gas spring and shock absorber damping automatically controllable in response to the loading of the gas spring, comprising a cylinder partly filled with damping liquid, a damping piston disposed in said cylinder and provided with throttle openings, a hollow piston rod carrying said damping piston, a protective tube surrounding and spaced from said damping cylinder, an adjusting rod mounted in said hollow piston rod and movable relative to said damping piston for controlling said throttle openings, a control member actuable by the load-dependent pressure in the gas spring for adjusting the movement of said adjusting rod to preselected positions, the gas spring, the shock absorber proper and said control member being combined in an integral unit, the gas spring being located in a space between said damping cylinder and said protective tube, said space being sealed by a bellows and being directly connected by a pressure gas connecting duct with a control chamber containing said control member and located at an end of said piston rod.

2. Hydraulic shock absorber assembly according to claim 1 wherein said bellows is a roller-type bellows.

3. Hydraulic shock absorber assembly according to claim 1 wherein said control member comprises a dome-like membrane extending into said control chamber, a correspondingly formed spring-biased pressure box supporting said dome-like membrane in the interior thereof and connected by a relatively narrow connecting rod, inserted sealingly in the piston rod bore, to said adjusting rod axially adjustable in said bore, said adjusting rod being smaller in diameter than the piston rod bore, the end of said adjusting rod located near said damping piston at an end of said piston rod formed with throttle openings being guidable in said piston rod bore and being provided with bores for the passage of liquid, said liquid-passage bores connecting the annular space between the adjusting rod and the inner surface of said piston rod to the working chamber of said damping cylinder.

4. Hydraulic shock absorber assembly according to claim 3 wherein said control chamber, said control membrane with pressure box and a supporting spring therefor are mounted in a multipartite housing secured at the free end of said piston rod, and an inwardly projecting annular flange is provided about halfway of the level of said housing for separating said control chamber from a lower chamber containing said pressure box and said supporting spring, said control membrane being sealingly pressed at its marginal periphery by a pressure ring inserted in said lower chamber of said housing against said annular flange.

5. Hydraulic shock absorber assembly according to claim 4 wherein said lower housing chamber containing said pressure box and said support spring is connected to the outer atmosphere.

6. Hydraulic shock absorber assembly according to claim 5 having a mounting location, said control chamber housing being located within said mounting location and comprising an upper housing portion having a suitably extending mounting member and a lower housing portion, both of said housing portions, near their periphery, being provided with bores forming pressure gas connecting ducts.

7. Hydraulic shock absorber assembly according to claim 6 wherein said mounting member is in the form of a pin.

8. Hydraulic shock absorber assembly according to claim 6 wherein said mounting member is in the form of a lug.

9. Hydraulic shock absorber assembly according to claim 5 having a mounting location, said control chamber being located outside of said mounting location and comprising a lower housing portion, a mounting tube located at said lower housing portion and surrounding and slightly spaced from said piston rod, said mounting tube having a lower enlarged end carrying said protective tube and a connecting sleeve for holding said bellows, and connecting channels communicating between the annular space located between said piston rod and said mounting tube and said gas spring space and said control chamber.

10. Hydraulic shock absorber assembly according to claim 9 including a pressure gas supply duct leading from a compressor and communicating with one of said gas spring and control chamber spaces.

11. Hydraulic shock absorber assembly according to claim 9 including a pressure gas supply duct leading from a filling valve and communicating with one of said gas spring and control chamber spaces.

References Cited

UNITED STATES PATENTS 3,173,671   3/1965   Broadwell _____ 267—64

ARTHUR L. LA POINT, *Primary Examiner.*

R. M. WOHLFARTH, *Assistant Examiner.*